US007887269B2

(12) United States Patent
Dost et al.

(10) Patent No.: US 7,887,269 B2
(45) Date of Patent: Feb. 15, 2011

(54) SPADE BIT WITH IMPROVED CUTTING GEOMETRY

(75) Inventors: Hagen Walter Dost, Chicago, IL (US); Javier Ibarra Sandoval, Schaumburg, IL (US)

(73) Assignee: Robert Bosch GmbH, Stuttgart (DE)

(*) Notice: Subject to any disclaimer, the term of this patent is extended or adjusted under 35 U.S.C. 154(b) by 792 days.

(21) Appl. No.: 11/973,653

(22) Filed: Oct. 10, 2007

(65) Prior Publication Data

US 2009/0097932 A1 Apr. 16, 2009

(51) Int. Cl.
*B23B 51/00* (2006.01)

(52) U.S. Cl. ....................... 408/227; 408/211; 408/213; 408/214; 408/228

(58) Field of Classification Search ......... 408/211-214, 408/224-225, 227, 228, 230; *B23B 51/00, B23B 51/02; B27G 15/00*
See application file for complete search history.

(56) References Cited

U.S. PATENT DOCUMENTS 2,627,292 A * 2/1953 Kronwall .................... 408/213
2,692,627 A 10/1954 Stearns
4,330,229 A 5/1982 Croydon
4,682,917 A 7/1987 Williams, III et al.
5,193,951 A 3/1993 Schimke
5,221,166 A 6/1993 Bothum (Continued)

FOREIGN PATENT DOCUMENTS

WO WO 9805459 A1 * 2/1998

(Continued)

OTHER PUBLICATIONS

Robert Bosch Tool Corporation - RAPIDFEED Spade Bit - 5 photographs; Publicly available at least as early as Oct. 9, 2007; (3 pages)

(Continued)

*Primary Examiner*—Daniel W Howell
(74) *Attorney, Agent, or Firm*—Maginot, Moore & Beck

(57) ABSTRACT

A spade bit includes a shaft defining an axis, and a blade attached to the shaft and having a first blade portion and a second blade portion. The first blade portion defines a first leading face portion, and the second blade portion defines a second leading face portion. The first blade portion defines a first cutting edge portion, and the second blade portion defines a second cutting edge portion. The first cutting edge portion lies on a first border portion of the first leading face portion, and the second cutting edge portion lies on a second border portion of the second leading face portion. The first cutting edge portion and the second cutting edge portion both lie in a plane P1. An area A1 is bound by the plane P1 and the first leading face portion when the first blade portion is viewed in a first cross section taken along a plane P2 which is parallel to and spaced apart from the axis by a distance D1, and the area A1 increases as the distance D1 increases. The area A2 is bound by the plane P1 and the second leading face portion when the second blade portion is viewed in a second cross section taken along a plane P3 which is parallel to and spaced apart from the axis by a distance D2, and the area A2 increases as the distance D2 increases.

22 Claims, 7 Drawing Sheets

U.S. PATENT DOCUMENTS

| | | | | |
|---|---|---|---|---|
| 5,286,143 | A | 2/1994 | Schimke | |
| 5,433,561 | A | 7/1995 | Schimke | |
| 5,452,970 | A * | 9/1995 | Sundstrom et al. | 408/211 |
| 5,700,113 | A | 12/1997 | Stone et al. | |
| D394,663 | S * | 5/1998 | Stone et al. | D15/139 |
| 6,227,774 | B1 | 5/2001 | Haughton et al. | |
| 6,354,773 | B1 | 3/2002 | Konen | |
| 6,957,937 | B2 | 10/2005 | Vasudeva | |
| 7,140,814 | B2 | 11/2006 | Singh et al. | |
| 7,267,513 | B2 * | 9/2007 | Wiker et al. | 408/214 |
| 7,473,056 | B2 * | 1/2009 | Durfee | 408/225 |
| 2006/0083595 | A1 | 4/2006 | Wiker et al. | |

FOREIGN PATENT DOCUMENTS

WO WO 2004/080632 9/2004

OTHER PUBLICATIONS

Irwin Industrial Tools - SPEEDBOR Woodboring Bit - 5 photographs; Publicly available at least as early as Oct. 9, 2007; (3 pages).
Vermont American - BLACKMAX Spade Bit - 5 Photographs; Publicly availabel at least as early as Oct. 9, 2007; (3 pages).

* cited by examiner

SPADE BIT WITH IMPROVED CUTTING GEOMETRY

BACKGROUND

The present disclosure relates generally to an accessory for a power tool, and more particularly relates to a spade bit.

Numerous spade bits have heretofore been designed for drilling relatively large holes in work pieces with power tools. Typical uses of these relatively large holes include the installation of electrical wiring and door locks in buildings. An example of an existing spade bit design is disclosed in U.S. Pat. No. 5,286,143 issued to Schimke, the disclosure of which is herein totally incorporated by reference in its entirety.

One of the continuing goals of designers of spade bits is to improve the cutting geometry of a spade bit. The spade bit's cutting geometry affects the speed at which holes may be drilled, as well as the rate of chip removal. Another continuing goal of spade bit designers is to improve the ease of manufacture of the spade bit.

What is needed therefore is a spade bit that has an improved cutting geometry. What is further needed is a spade bit with improved cutting geometry that is relatively easy to manufacture.

SUMMARY

In accordance with one embodiment of the disclosure, there is provided a spade bit that includes a shaft defining an axis about which the spade bit is configured to be rotated. The spade bit further includes a blade attached to the shaft and having a first blade portion and a second blade portion. The first blade portion defines a first concave leading face portion and a first convex trailing face portion, and the second blade portion defines a second concave leading face portion and a second convex trailing face portion. The first blade portion includes a first shoulder that defines a first cutting edge portion, and the second blade portion includes a second shoulder that defines a second cutting edge portion. The first cutting edge portion lies on a first border portion of the first concave leading face portion, and the second cutting edge portion lies on a second border portion of the second concave leading face portion. The first cutting edge portion and the second cutting edge portion both lie in a plane P1. An area A1 is defined between the plane P1 and the first concave leading face portion when the first blade portion is viewed in a first cross section taken along a plane P2 which is parallel to and spaced apart from the axis by a distance D1, and the area A1 increases as the distance D1 increases. An area A2 is defined between the plane P1 and the second concave leading face portion when the second blade portion is viewed in a second cross section taken along a plane P3 which is parallel to and spaced apart from the axis by a distance D2, and the area A2 increases as the distance D2 increases.

Pursuant to another embodiment of the disclosure, there is provided a spade bit that includes a shaft defining an axis, and a blade attached to the shaft. The blade has a first blade portion and a second blade portion. The first blade portion defines a first leading face portion, and the second blade portion defines a second leading face portion. The first blade portion defines a first cutting edge portion, and the second blade portion defines a second cutting edge portion. The first cutting edge portion lies on a first border portion of the first leading face portion, and the second cutting edge portion lies on a second border portion of the second leading face portion. The first cutting edge portion and the second cutting edge portion both lie in a plane P1. An area A1 is bound by the plane P1 and the first leading face portion when the first blade portion is viewed in a first cross section taken along a plane P2 which is parallel to and spaced apart from the axis by a distance D1, and the area A1 increases as the distance D1 increases. An area A2 is bound by the plane P1 and the second leading face portion when the second blade portion is viewed in a second cross section taken along a plane P3 which is parallel to and spaced apart from the axis by a distance D2, and the area A2 increases as the distance D2 increases.

DESCRIPTION OF THE PREFERRED EMBODIMENTS

Figure 1:
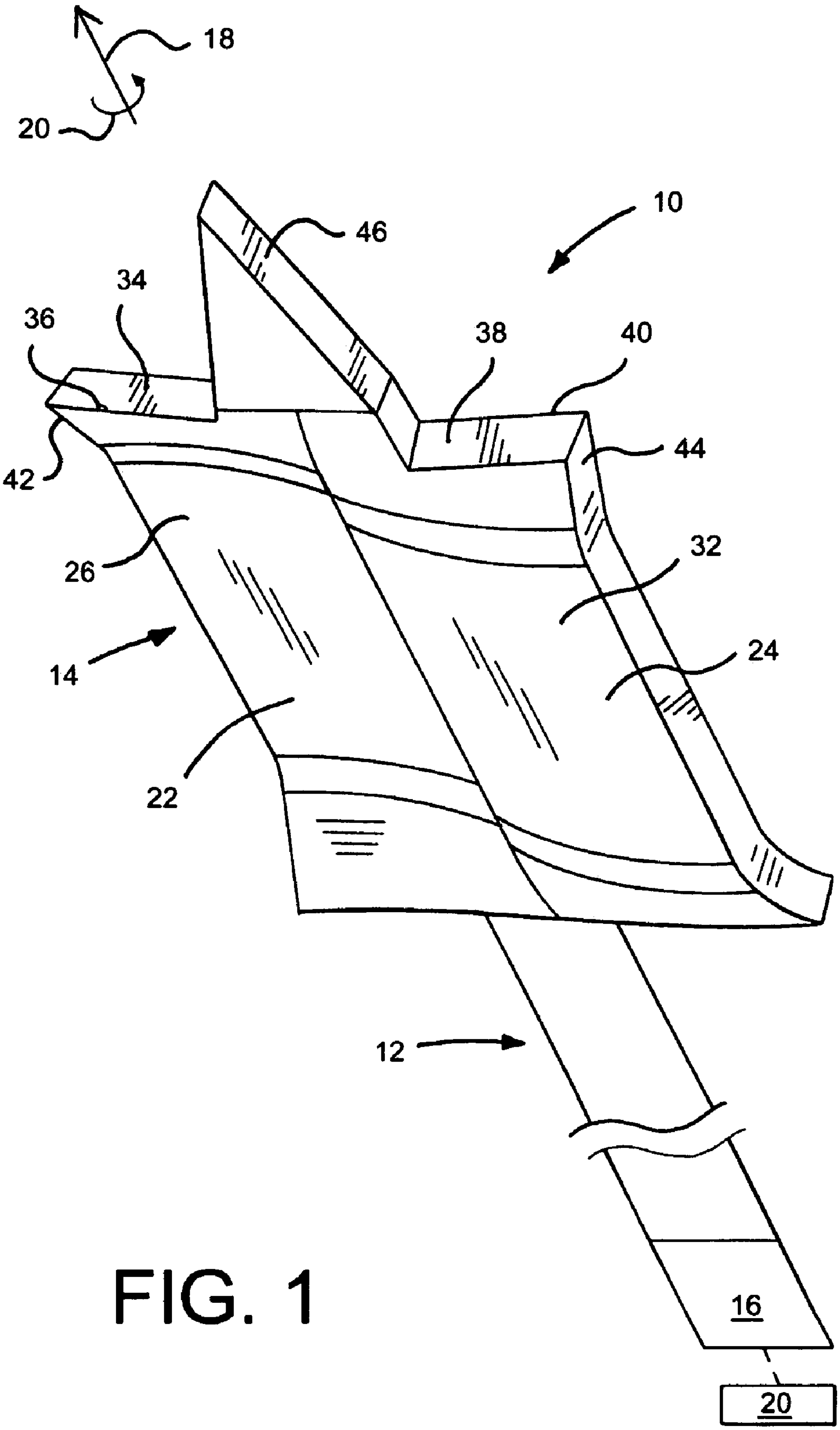
FIG. 1 is a partial perspective, partial schematic view of the spade bit according to the present disclosure.

While the spade bit described herein is susceptible to various modifications and alternative forms, specific embodiments thereof have been shown by way of example in the drawings and will herein be described in detail. It should be understood, however, that there is no intent to limit the spade bit to the particular forms disclosed, but on the contrary, the intention is to cover all modifications, equivalents, and alternatives falling within the spirit and scope of the invention as defined by the appended claims.

Referring now to FIG. 1, there is shown a spade bit 10. The spade bit 10 includes a shaft 12 and a paddle or blade 14. The shaft 12 includes a polygonal-shaped end portion 16 such as a hexagonally-shaped end portion. The polygonal-shaped end portion 16 of the shaft 12 is schematically shown in FIG. 1. As an example, the polygonal-shaped end portion 16 may be identical in construction and configuration to the hexagonal driving end 16 of the spade bit disclosed in U.S. Pat. No. 5,286,143 issued to Schimke, the disclosure of which is herein totally incorporated by reference in its entirety.

The shaft 12 defines an axis 18 about which the spade bit 10 is configured to be rotated. In particular, the polygonal-shaped end portion 16 is configured to be received in a chuck of a power drill 20 as schematically shown in FIG. 1. During operation of the power drill 20 with the end portion 16 secured firmly within its chuck, the spade bit 10 is rotated in a path of movement about the axis 18 in the direction of arrow 20. So rotated, the spade bit 10 is configured to cut a hole (not shown) in a work piece (not shown).

The blade 14 includes a blade portion 22 and a blade portion 24. The blade portion 22 defines a leading face portion 26 and a trailing face portion 28. The leading face portion 26 is shaped to possess a concave configuration as shown in FIGS. 1-8. In contrast, the trailing face portion 28 is shaped to possess a convex configuration. Similarly, the blade portion 24 defines a leading face portion 30 and a trailing face portion 32. The leading face portion 30 is shaped to possess a concave configuration, and the trailing face portion 32 is shaped to possess a convex configuration.

The blade portion 22 includes a shoulder 34 that defines a cutting edge portion 36. Similarly, the blade portion 24 includes a shoulder 38 that defines a cutting edge portion 40. As shown in FIG. 1, the cutting edge portion 36 lies on a border portion of the leading face portion 26. Similarly, the cutting edge portion 40 lies on a border portion of the leading face portion 30.

Figure 2:
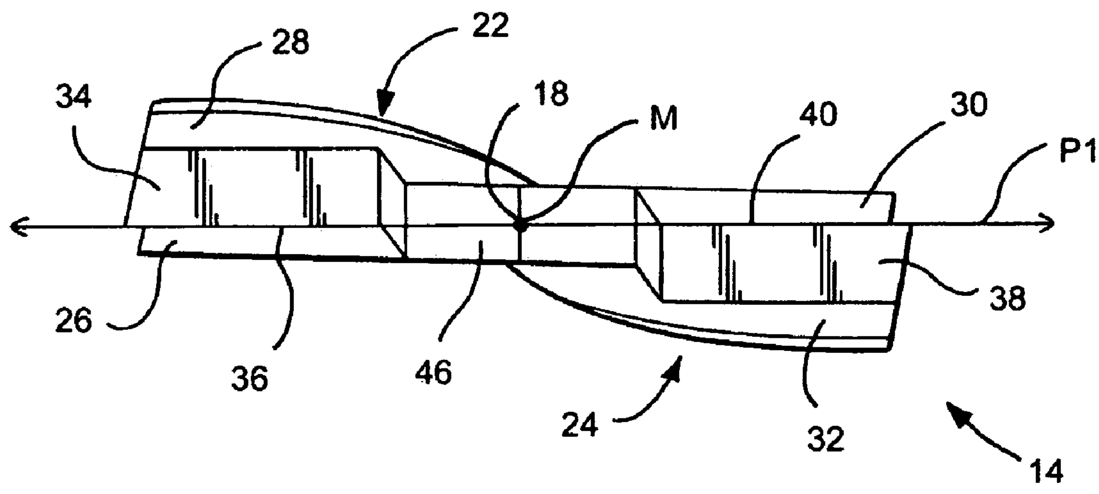
FIG. 2 is top elevational view of the space bit of FIG. 1, with the shaft removed for clarity of viewing.
Figure 4:
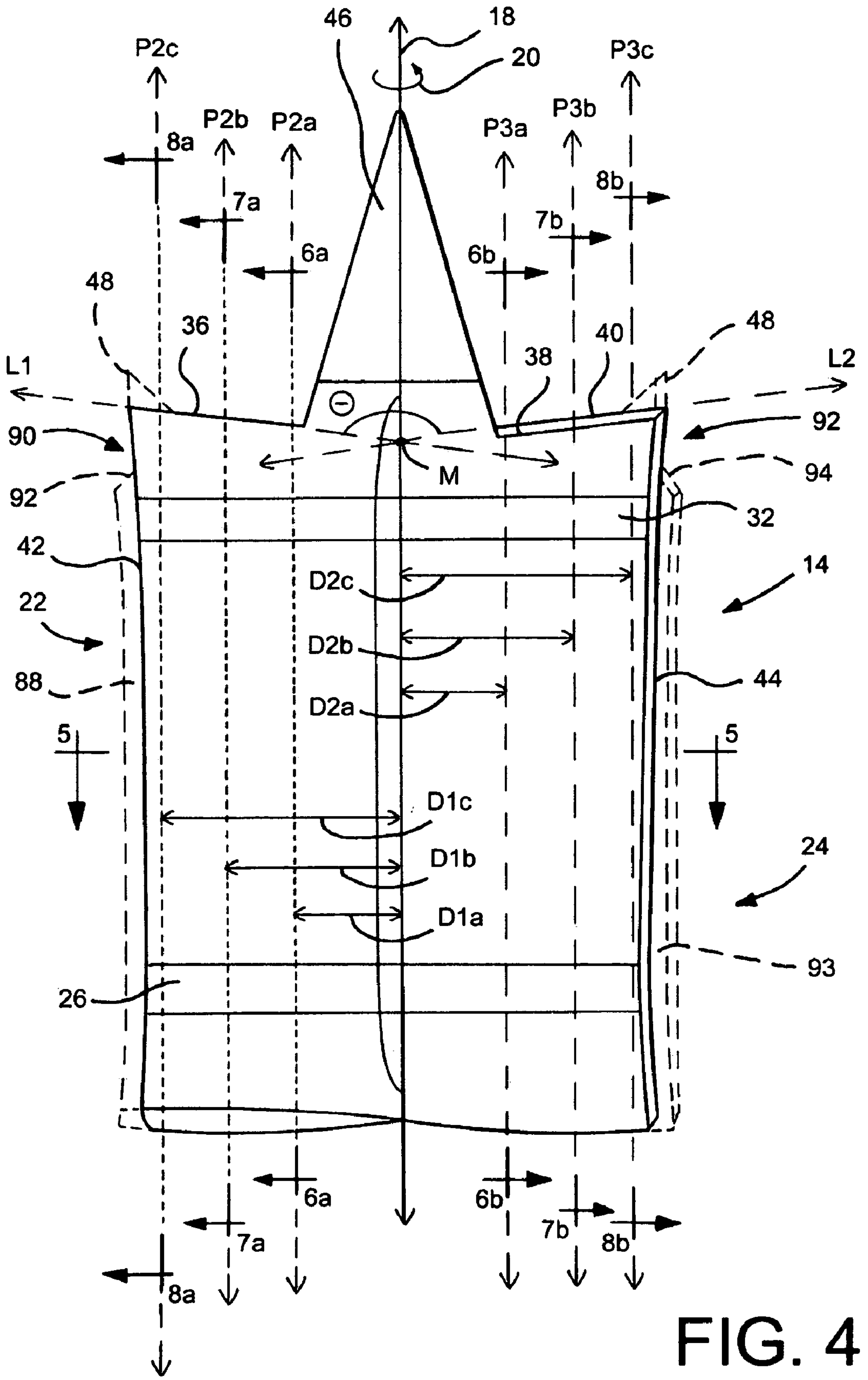
FIG. 4 is side elevational view of the space bit of FIG. 1, with the shaft removed for clarity of viewing.

As shown in FIG. 4, the cutting edge portion 36 defines a line L1, while the cutting edge portion 40 defines a line L2. Both the lines L1 and L2 lie in a plane P1 as shown in FIG. 2. It should be appreciated that what is meant herein by the language "the cutting edge portion defines a line" is the blade 14 is manufactured so that the cutting edge portion 36, 40 substantially defines a line, with any variances from absolutely defining a line being due to normal commercial manufacturing tolerances. It should further be appreciated that what is meant herein by the language "the line lies in a plane" or "the cutting edge portion lies in a plane" is the blade 14 is manufactured so that the line L1, L2 substantially lies in a plane or the cutting edge portion 36, 40 substantially lies in a plane, with any variances from absolutely lying in a plane being due to normal commercial manufacturing tolerances.

An area A1 (see FIGS. 6-8) is defined between the plane P1 and the leading face portion 26 when the blade portion 22 is viewed in a cross section taken along a plane P2 which is spaced apart from the axis 18 by a distance D1 (see FIG. 4). A1 increases as the distance D1 increases. The blade portion 22 is identical in construction and configuration to the blade portion 24. Accordingly, an area A2 (see FIGS. 6-8) is defined between the plane P1 and the leading face portion 30 when the blade portion 24 is viewed in a cross section taken along a plane P3 which is spaced apart from the axis 18 by a distance D2 (see FIG. 4). A2 increases as the distance D2 increases.

Figure 6:
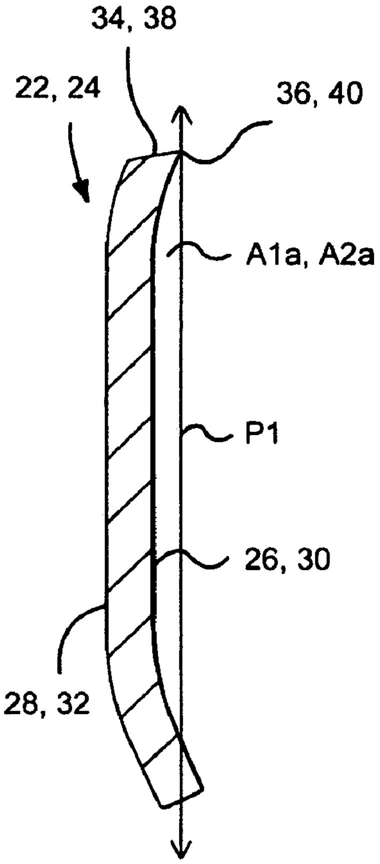
FIG. 6 is (i) a cross sectional view of the blade of the spade bit taken along the line 6*a*-6*a* of FIG. 4, and (ii) a cross sectional view of the blade of the spade bit taken along the line 6*b*-6*b* of FIG. 4 after the spade bit is rotated 180° about the axis 18 with respect to its position in FIG. 4.
Figure 7:
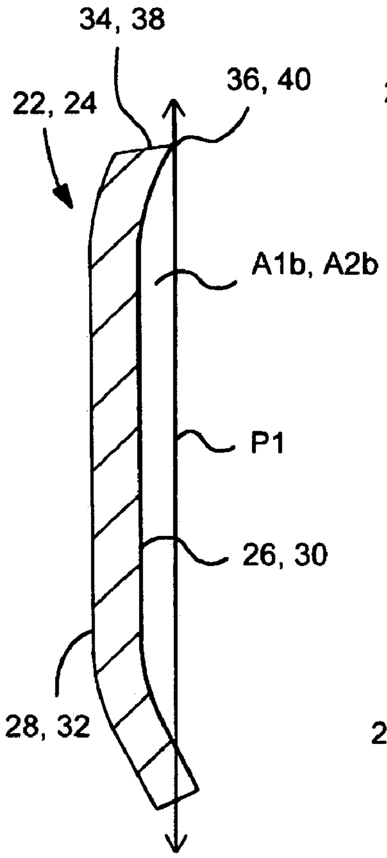
FIG. 7 is (i) a cross sectional view of the blade of the spade bit taken along the line 7*a*-7*a* of FIG. 4, and (ii) a cross sectional view of the blade of the spade bit taken along the line 7*b*-7*b* of FIG. 4 after the spade bit is rotated 180° about the axis 18 with respect to its position in FIG. 4.
Figure 8:
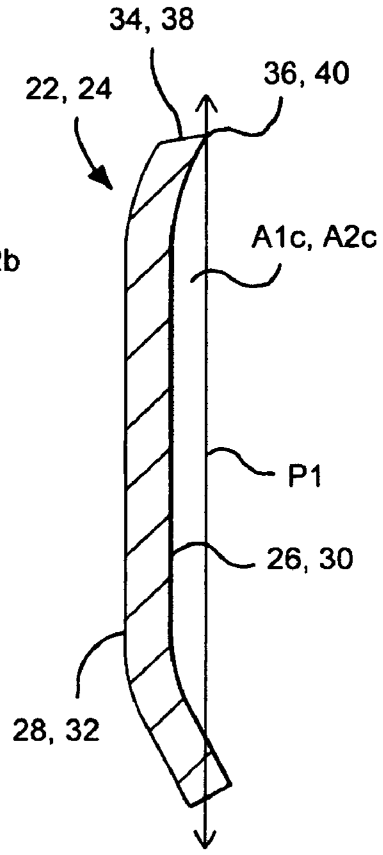
FIG. 8 is (i) a cross sectional view of the blade of the spade bit taken along the line 8*a*-8*a* of FIG. 4, and (ii) a cross sectional view of the blade of the spade bit taken along the line 8*b*-8*b* of FIG. 4 after the spade bit is rotated 180° about the axis 18 with respect to its position in FIG. 4.

Referring again to FIGS. 4 and 6-8, there is shown the blade 14 in more detail. In particular, FIG. 6 shows a cross section of the blade portion 22 taken along the line 6a-6a of FIG. 4. Note that this cross section is taken in a plane P2a that is spaced apart from the axis 18 by a distance D1a. As can be seen in FIG. 6, the area A1a is defined between the plane P1 and the leading face portion 26. FIG. 7 shows a cross section of the blade portion 22 taken along the line 7a-7a of FIG. 4. Note that this cross section is taken in a plane P2b that is spaced apart from the axis 18 by a distance D1b. As can be seen in FIG. 7, the area A1b is defined between the plane P1 and the leading face portion 26. FIG. 8 shows a cross section of the blade portion 22 taken along the line 8a-8a of FIG. 4. Note that this cross section is taken in a plane P2c that is spaced apart from the axis 18 by a distance D1c. As can be seen in FIG. 8, the area A1c is defined between the plane P1 and the leading face portion 26. It should be appreciated that $D1a<D1b<D1c$. Moreover, it should be appreciated that $A1a<A1b<A1c$. As stated above, A1 increases as the distance D1 increases, and this relationship continues with an increasing D1 until the lateral edge 42 of the blade portion 22 is reached.

Similarly, FIG. 6 shows a cross section of the blade portion 24 taken along the line 6b-6b of FIG. 4 after the spade bit is rotated 180° about the axis 18 with respect to its position in FIG. 4. Note that this cross section is taken in a plane P3a that is spaced apart from the axis 18 by a distance D2a. As can be seen in FIG. 6, the area A2a is defined between the plane P1 and the leading face portion 30. FIG. 7 shows a cross section of the blade portion 24 taken along the line 7b-7b of FIG. 4 after the spade bit is rotated 180° about the axis 18 with respect to its position in FIG. 4. Note that this cross section is taken in a plane P3b that is spaced apart from the axis 18 by a distance D2b. As can be seen in FIG. 7, the area A2b is defined between the plane P1 and the leading face portion 30. FIG. 8 shows a cross section of the blade portion 24 taken along the line 8b-8b of FIG. 4 after the spade bit is rotated 180° about the axis 18 with respect to its position in FIG. 4. Note that this cross section is taken in a plane P3c that is spaced apart from the axis 18 by a distance D2c. As can be seen in FIG. 8, the area A2c is defined between the plane P1 and the leading face portion 30. It should be appreciated that $D2a<D2b<D2c$. Moreover, it should be appreciated that $A2a<A2b<A2c$. As stated above, A2 increases as the distance D2 increases, and this relationship continues with an increasing D2 until the lateral edge 44 of the blade portion 24 is reached.

As shown in FIGS. 6-8, the area A1 is bound by the plane P1 and the leading face portion 26 when viewed in such cross section. More specifically, the plane P1 and the leading face portion 26 completely enclose the area A1 when viewed in such cross section. While this arrangement is preferred, many advantages are still obtained when the plane P1 and the leading fact portion 26 do not completely enclose the area A1. Similarly, as shown in FIGS. 6-8, the area A2 is bound by the plane P1 and the leading face portion 30 when viewed in such cross section. More specifically, the plane P1 and the leading face portion 30 completely enclose the area A2 when viewed in such cross section. While this arrangement is preferred, many advantages are still obtained when the plane P1 and the leading fact portion 30 do not completely enclose the area A2.

Figure 3:
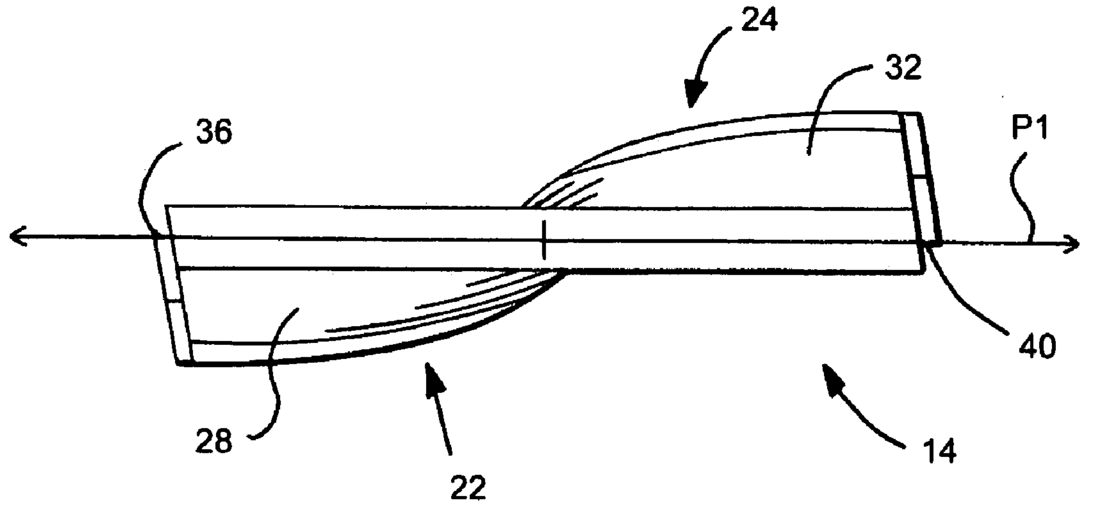
FIG. 3 is bottom elevational view of the space bit of FIG. 1, with the shaft removed for clarity of viewing.
Figure 5:
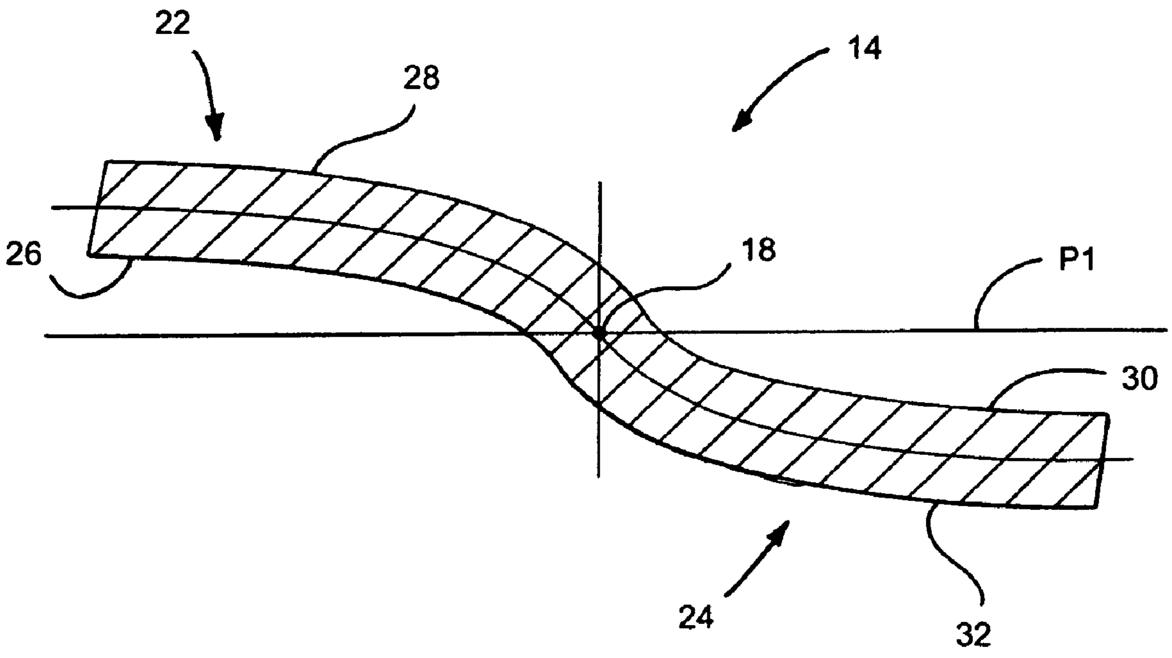
FIG. 5 is a cross sectional view of the blade of the spade bit taken along the line 5-5 of FIG. 4.

Referring now to FIGS. 2, 3, and 5, the plane P1 is shown with respect to the blade 14 in various views. The plane P1 divides the blade 14 into two equal parts. FIGS. 2 and 4 show the line L1 and the line L2 with respect to the blade 14 in different views. FIG. 2 shows both lines L1 (defined by the cutting edge portion 36) and L2 (defined by the cutting edge portion 40) being located in the plane P1. Also, the line L1 intersects the line L2 at a point M so as to define an angle Θ. Preferably, the angle Θ is between 162° and 174°. However, the angle Θ may be more than 174° (or less than 162°) and still achieve many of the benefits of the spade bit 10 described herein. For example, the angle Θ may be 180° or alternatively may be 150°. Note that the point M lies on the axis 18 as shown in FIG. 4. Also note that the longitudinal axis 18 is positioned in plane P1 as shown in FIG. 2.

The spade bit 10 further includes a tip portion 46. The blade 14 is interposed between the tip portion 46 and the shaft 12 as shown in FIG. 1. The tip portion 46 is non-threaded. As an example, the tip portion 46 may be identical in construction and configuration to the central point 48 of the spade bit disclosed in U.S. Pat. No. 5,286,143 issued to Schimke. Alternatively, the tip portion 46 may be partially threaded or may be entirely threaded. For example, the tip portion 46 may be identical in construction and configuration to any of the threaded tip portions of the spade bits disclosed in U.S. Patent Application Publication No. 2006/0083595 published on Apr. 20, 2006 (Wiker et al.), the disclosure of which is herein totally incorporated by reference in its entirety. In addition, a threaded portion may be added to each of the lateral edges 42, 44 of the blade 14. For example, such threaded portion may be identical in construction and configuration to the outer threads 260 of the spade bit disclosed in U.S. Patent Application Publication No. 2006/0083595 published on Apr. 20, 2006 (Wiker et al.).

The blade 14 is configured such the that shoulders 34, 38 have a planar top surface that extends from the tip portion 46 to the lateral edges 42, 44. Alternatively, the blade 14 includes a pair of spurs 48 extending from the shoulders portions 34, 38 as shown in phantom in FIG. 4. The spurs 48 may be identical in construction and configuration to the spurs 62, 64 of the spade bit disclosed in U.S. Pat. No. 5,286,143 issued to Schimke.

As a further alternative, each of the blade portions 22, 24 may be configured so that the spade bit 10 is a reamer. In particular, as shown in FIG. 4, the blade portion 22 includes a lateral extension portion 88 (shown in phantom) that is configured to define a relief space 90 located above a sloping surface 92 of the lateral extension portion 88. Similarly, the blade portion 24 includes a lateral extension portion 93 (shown in phantom) that is configured to define a relief space 92 located above a sloping surface 94 of the lateral extension portion 93. The lateral extension portion 88 is integrally formed with the rest of the blade portion 22, while the lateral extension portion 93 is integrally formed with the rest of the blade portion 24.

Figure 9:
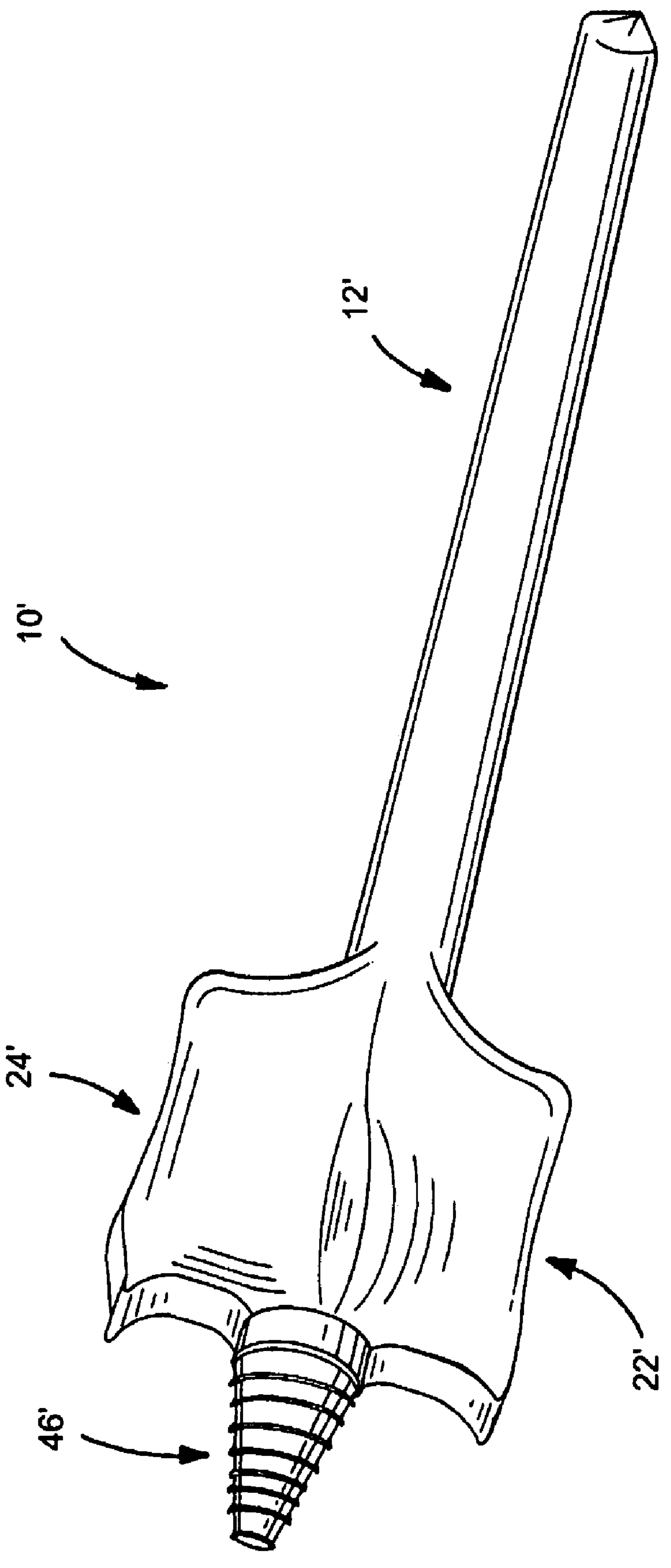
FIG. 9 is a perspective view of another embodiment of a spade bit according to the present disclosure.
Figure 10:
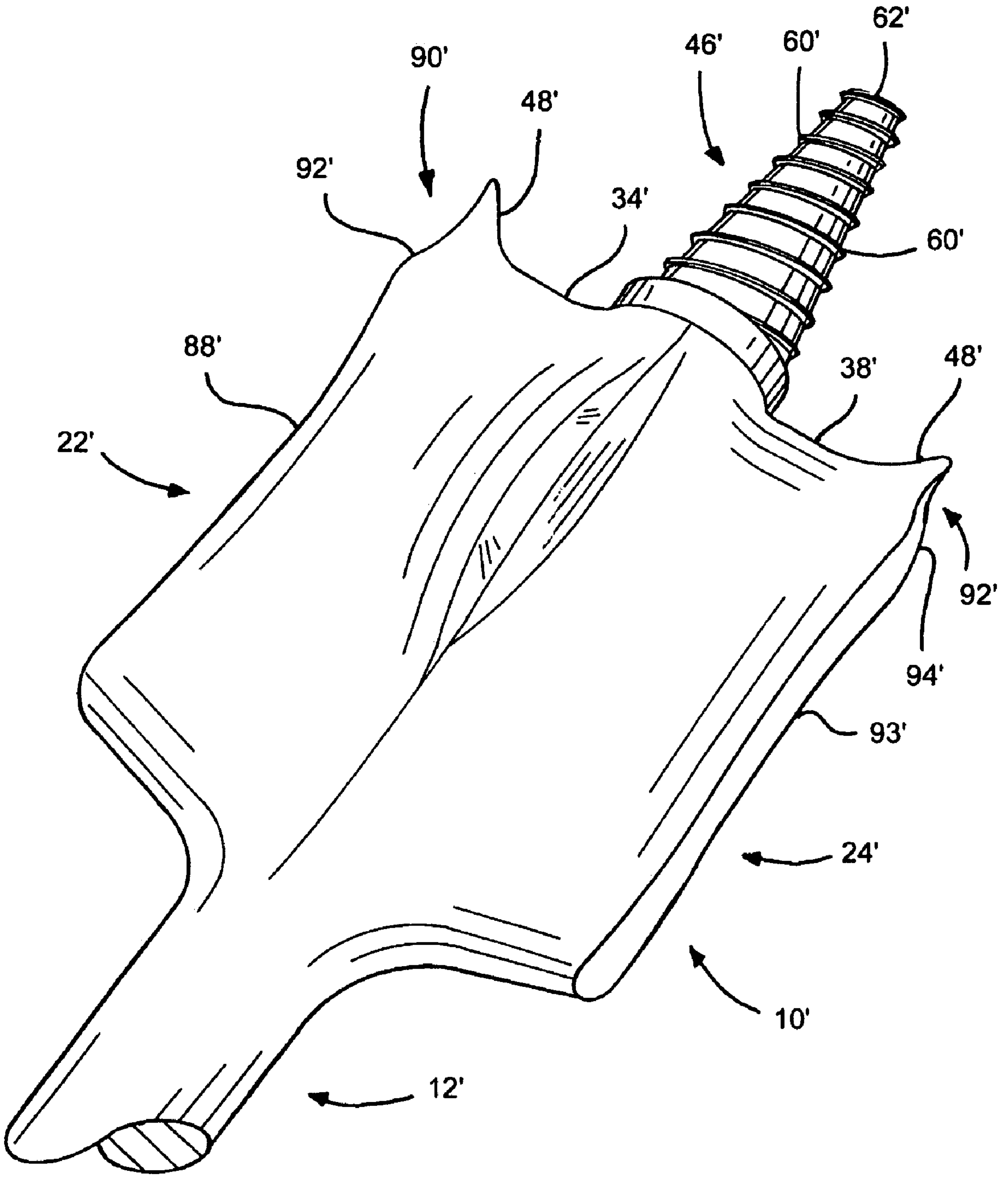
FIG. 10 is an enlarged fragmentary view of the spade bit of FIG. 9.

Turning now to FIGS. 9 and 10, there is shown another embodiment of a spade bit 10' according to the present disclosure. The spade bit 10' is identical in construction and configuration to the spade bit 10 of FIG. 1, except for three differences. As a result, like reference numerals (ones without prime symbols and ones with prime symbols) will be used for corresponding features of the two spade bits 10, 10'.

The first difference relates to the tip portions 46, 46' of the spade bits 10, 10'. In particular, the spade bit 10' includes a frusto-conically-shaped tip portion 46' having threads 60' extending from its apex 62' to a location adjacent to its shoulders 34' and 38' as shown in FIGS. 9 and 10. Alternatively, the tip portion 46' may be entirely conical with threads 60' running from its apex 62' to a location adjacent to its shoulders 34' and 38' as shown in FIGS. 9 and 10. As a further alternative, the threads 60' of the tip portion 46' may extend from its apex 62' all the way to its shoulders 34' and 38'.

The second difference between the spade bit 10 of FIG. 1 and the spade bit 10' of FIGS. 9 and 10 is due to the spade bit 10' being configured as a reamer. In particular, as shown in FIGS. 9 and 10, the blade portion 22' includes a lateral extension portion 88' that is configured to define a relief space 90' located above a sloping surface 92' of the lateral extension portion 88'. Similarly, the blade portion 24' includes a lateral extension portion 93' that is configured to define a relief space 92' located above a sloping surface 94' of the lateral extension portion 93'. The lateral extension portion 88' is integrally formed with the rest of the blade portion 22', while the lateral extension portion 93' is integrally formed with the rest of the blade portion 24'.

The third difference between the spade bit 10 of FIG. 1 and the spade bit 10' of FIGS. 9 and 10 relates to the spade bit 10' having a pair of spurs 48' extending from its shoulders portions 34', 38'. The spurs 48' may be configured to be identical in construction and configuration to the spurs 62, 64 of the spade bit disclosed in U.S. Pat. No. 5,286,143 issued to Schimke. There is a plurality of advantages arising from the various features of each of the embodiments of the spade bit described herein. It will be noted that alternative embodiments of the spade bit may not include all of the features described yet still benefit from at least some of the advantages of such features. Those of ordinary skill in the art may readily devise their own implementations of the spade bit that incorporates one or more of the features and fall within the spirit and scope of the present invention as defined by the appended claims.

What is claimed is:

1. A spade bit, comprising:

a shaft defining an axis about which the spade bit is configured to be rotated;

a blade attached to said shaft and having a first blade portion and a second blade portion, wherein (i) said first blade portion defines a first concave leading face portion and a first convex trailing face portion, and (ii) said second blade portion defines a second concave leading face portion and a second convex trailing face portion, wherein (i) said first blade portion includes a first shoulder that defines a first cutting edge portion, and (ii) said second blade portion includes a second shoulder that defines a second cutting edge portion, wherein (i) said first cutting edge portion lies on a first border portion of said first concave leading face portion, and (ii) said second cutting edge portion lies on a second border portion of said second concave leading face portion, wherein said first cutting edge portion and said second cutting edge portion both lie in a plane P1, wherein (i) an area A1 is defined between said plane P1 and said first concave leading face portion when said first blade portion is viewed in a first cross section taken along a plane P2 which is parallel to and spaced apart from said axis by a distance D1, and (ii) said area A1 increases as said distance D1 increases, and wherein (i) an area A2 is defined between said plane P1 and said second concave leading face portion when said second blade portion is viewed in a second cross section taken along a plane P3 which is parallel to and spaced apart from said axis by a distance D2, and (ii) said area A2 increases as said distance D2 increases.

2. The spade bit of claim 1, wherein said plane P1 divides said blade into two equal parts.

3. The spade bit of claim 1, wherein:

said first cutting edge portion defines a line L1, said second cutting edge portion defines a line L2, and said line L1 intersects said line L2 at a point so as to form an angle Θ.

4. The spade bit of claim 1, wherein $162° < \Theta < 174°$.

5. The spade bit of claim 1, further comprising a tip portion attached to said blade, wherein:

said blade is interposed said tip portion and said shaft.

6. The spade bit of claim 5, wherein said tip portion is at least partially threaded.

7. The spade bit of claim 5, wherein said tip portion is non-threaded.

8. The spade bit of claim 1, wherein said axis is positioned in said plane P1.

9. The spade bit of claim 1, wherein:

said first blade portion further includes a first spur extending from said first shoulder portion, and said second blade portion further includes a second spur extending from said second shoulder portion.

10. The spade bit of claim 1, wherein said shaft includes a polygonal-shaped end portion that is configured to be received within a chuck of a power tool.

11. A spade bit, comprising:

a shaft defining an axis;

a blade attached to said shaft and having a first blade portion and a second blade portion, wherein (i) said first blade portion defines a first leading face portion, and (ii) said second blade portion defines a second leading face portion, wherein (i) said first blade portion defines a first cutting edge portion, and (ii) said second blade portion defines a second cutting edge portion, wherein (i) said first cutting edge portion lies on a first border portion of said first leading face portion, and (ii) said second cutting edge portion lies on a second border portion of said second leading face portion, wherein said first cutting edge portion and said second cutting edge portion both lie in a plane P1, wherein (i) an area A1 is bound by said plane P1 and said first leading face portion when said first blade portion is viewed in a first cross section taken along a plane P2 which is parallel to and spaced apart from said axis by a distance D1, and (ii) said area A1 increases as said distance D1 increases, and wherein (i) an area A2 is bound by said plane P1 and said second leading face portion when said second blade portion is viewed in a second cross section taken along a plane P3 which is parallel to and spaced apart from said axis by a distance D2, and (ii) said area A2 increases as said distance D2 increases.

12. The spade bit of claim 11, wherein said plane P1 divides said blade into two equal parts.

13. The spade bit of claim 11, wherein:

said first cutting edge portion defines a line L1, said second cutting edge portion defines a line L2, and said line L1 intersects said line L2 at a point so as to form an angle Θ.

14. The spade bit of claim 13, wherein $162° < \Theta < 174°$.

15. The spade bit of claim 11, further comprising a tip portion attached to said blade, wherein:

said blade is interposed said tip portion and said shaft.

16. The spade bit of claim 15, wherein said tip portion is at least partially threaded.

17. The spade bit of claim 15, wherein said tip portion is non-threaded.

18. The spade bit of claim 11, wherein said axis is positioned in said plane P1.

19. The spade bit of claim 11, wherein:

said first blade portion further includes a first spur positioned adjacent to said first cutting edge portion, and said second blade portion further includes a second spur positioned adjacent to said second cutting edge portion.

20. The spade bit of claim 11, wherein said shaft includes a polygonal-shaped end portion that is configured to be received within a chuck of a power tool.

21. The spade bit of claim 11, wherein each of said first leading face portion and said second leading face portion are concave in configuration.

22. The spade bit of claim 11, wherein:

said first blade portion includes a first shoulder that defines said first cutting edge portion, and said second blade portion includes a second shoulder that defines said second cutting edge portion.

* * * * *